June 13, 1961 C. F. BAROTHY ET AL 2,988,234
TWO-POSITION WORK-FEEDING APPARATUS
Filed March 18, 1959 4 Sheets-Sheet 1

INVENTORS
C. F. BAROTHY
K. R. LAGLER
BY R. P. Miller
ATTORNEY

June 13, 1961  C. F. BAROTHY ET AL  2,988,234
TWO-POSITION WORK-FEEDING APPARATUS
Filed March 18, 1959  4 Sheets-Sheet 2
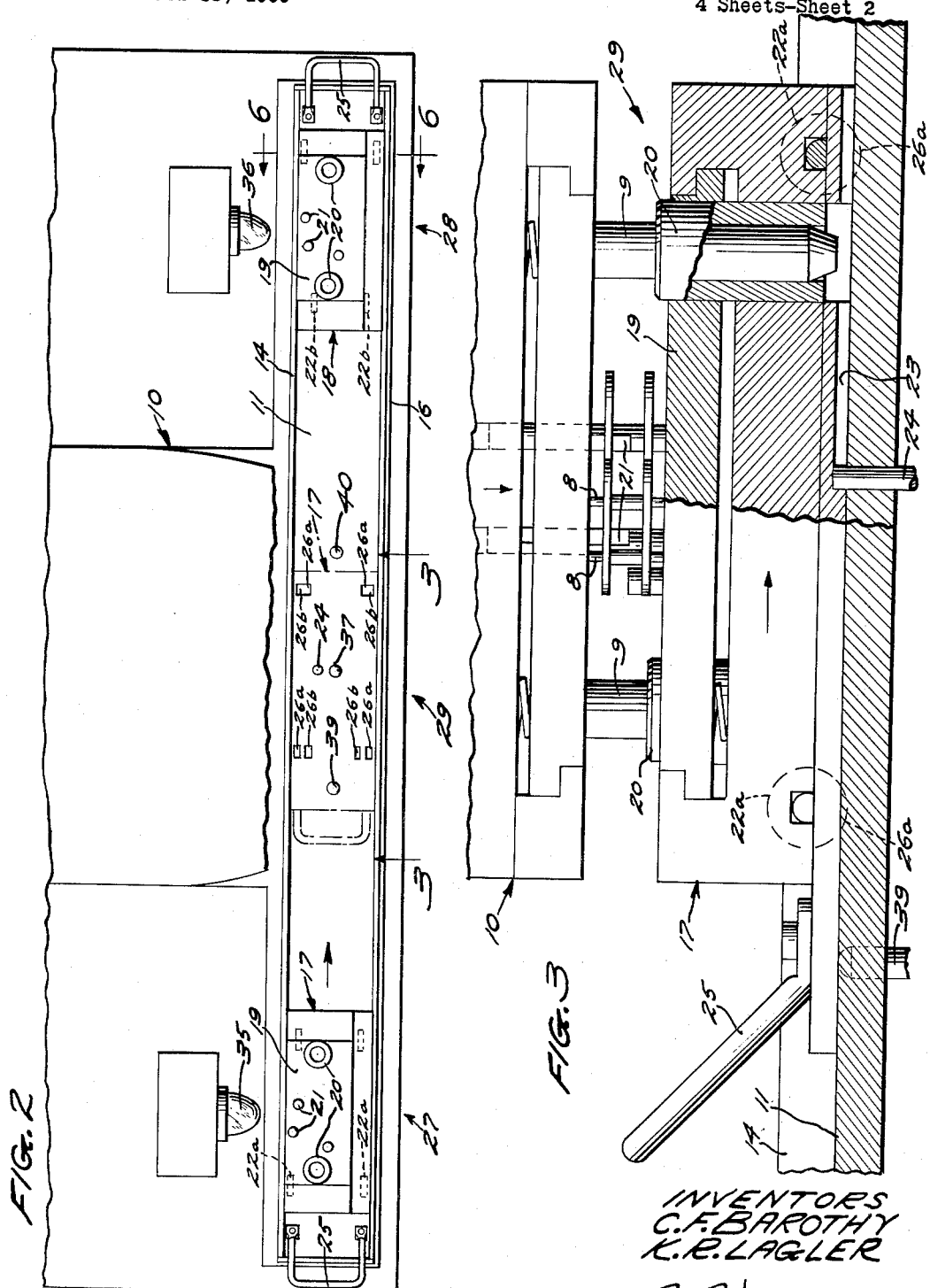
INVENTORS
C.F. BAROTHY
K.R. LAGLER
BY R.P. Miller
ATTORNEY

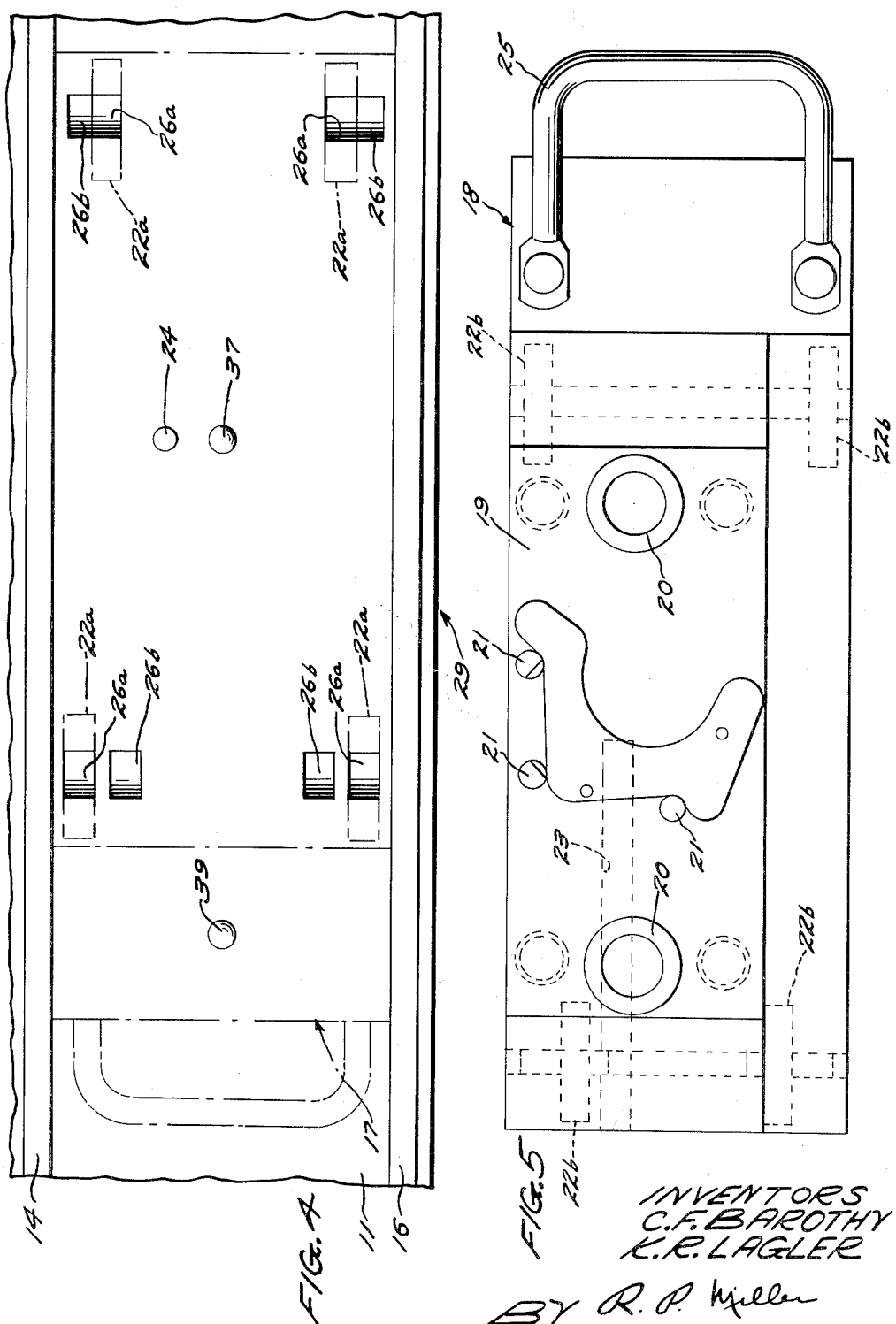

INVENTORS
C. F. BAROTHY
K. R. LAGLER
BY R. P. Miller
ATTORNEY

United States Patent Office 2,988,234
Patented June 13, 1961

---

2,988,234
TWO-POSITION WORK-FEEDING APPARATUS
Charles F. Barothy and Karl R. Lagler, Indianapolis, Ind., assignors to Western Electric Company, Incorporated, New York, N.Y., a corporation of New York
Filed Mar. 18, 1959, Ser. No. 800,301
13 Claims. (Cl. 214—1)

This invention relates to a two-position work-feeding apparatus and more particularly to a device provided with electrical instrumentalities that are rendered effective by an advancing workpiece carrier for indicating the advance of the carrier to a fabricating machine while simultaneously conditioning the fabricating machine and a counter means for operation.

In numerous manufacturing processes, it is desirable to provide manufacturing devices such as drill presses, punch presses, staking presses and the like with facilities whereby workpieces may be alternately fed to the machine by operators at different load position. However, where normal communication between two load positions is precluded, it is imperative that such facilities be adapted with instrumentalities that will alleviate the possibility of simultaneous feeding of workpieces into a single work station. To insure that the other operator or operators be apprised of the insertion of a workpiece into a work station, indicating means should be provided that are rendered effective the instant that a workpiece is advanced toward the work station. Another desirable feature of a work-feeding arrangement of this type is the provision of electrical means that are rendered effective by the positive positioning of a workpiece within a work station to actuate the manufacturing device to perform the desired operation.

It is a primary object of this invention to provide a new and improved two-position work-feeding apparatus.

Another object of the invention resides in electrical instrumentalities that are rendered effective to indicate the initiation of the advancement of a workpiece carrier to a work station and subsequently record the completed cycle of operation of the work station.

An additional object of the invention is to provide work carriers having slotted sections that extend from the forward end to the middle of the carrier and are cooperable with a stop pin on a work-feed table to positively position the work within a work station.

Still another object of the invention resides in a pair of workpiece carriers that are mounted on wheels, the wheels being positioned in different patterns on each carrier and cooperable with distinct patterns of notches formed in a guideway for insuring the positive positioning of a carrier at a desired position.

A further and more finite object of the invention resides in the provision of a work-feed table having guideways extending along the sides of the table and having notches spaced to receive the wheels of a work carrier which has been fully advanced into a work station to maintain the carrier in fixed position while simultaneously initiating a cycle of operation of a manufacturing device.

With these and other objects in view, the present invention contemplates a work-feeding apparatus having a pair of work carriers that are located at opposite ends of a work-feed table and provided with wheels for movement along the table toward a manufacturing device. Upon initiating the advancement of one of the carriers toward a work station, a warning system is operated to immediately apprise the other operator or operators that a carrier is being advanced to the work station. When the carrier is properly aligned within the work station, the wheels thereof will drop into a plurality of notches or recesses formed in the work-feed table. As the wheels drop into the notches formed in the table, the body of the carrier will actuate a switch which will result in the initiation of a cycle of operation of the manufacturing device to which the work-feeding device has been adapted.

Other objects and advantages of the present invention will become apparent from the following detailed description when considered in conjunction with the accompanying drawings wherein:

FIG. 2 is a fragmentary top view of the apparatus taken along the line 2—2 of FIG. 1;

FIG. 3 is an enlarged view partially in section taken along the line 3—3 of FIG. 2 and illustrating the details of construction of a workpiece carrier and a cooperating fabricating apparatus;

FIG. 4 is an enlarged fragmentary plan view illustrating a notched guideway with a carrier, shown in phantom outline, from one loading position positively seated therein;

FIG. 5 is an enlarged plan view of another workpiece carrier having wheels set in a pattern cooperable with the remaining notches of the guideway;

Figure 1:
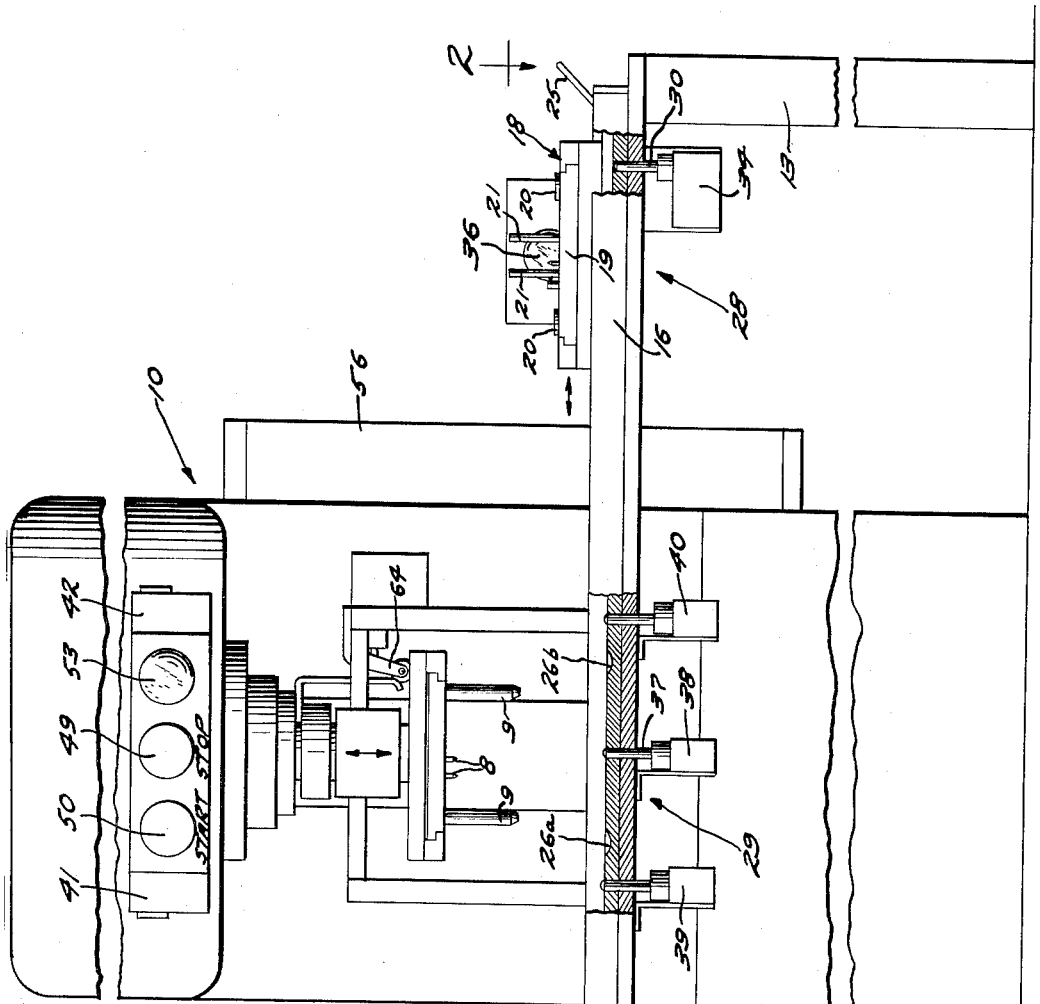
FIG. 1 is a front view partially broken away of a two-position work-feeding apparatus embodying the principles of the present invention.

Referring to FIG. 1, there is disclosed a staking press generally designated by the numeral 10 that is adapted with a work-feed table 11 extending laterally from both sides of the press. Though the present invention is described with respect to a staking press, it is equally feasible to utilize other fabricating devices such as a drill, a miller, a slotter, etc. The work-feed table 11 is supported at the center by the press 10 and at the ends by the support members 12 and 13. As illustrated in FIG. 2, the work-feed table provides a guideway comprising a pair of guide rails 14 and 16 that extend across the length of the table. Positioned between the guide rails for movement therethrough are a pair of workpiece carriers generally designated by the numerals 17 and 18.

The details of the workpiece carriers 17 and 18 are most clearly illustrated in FIGS. 3 and 5. The carriers are provided with a resiliently mounted plate 19 to which is secured a plurality of locating or work-holding pins 21. Each carrier is mounted on two pairs of offset wheels generally designated by the numeral 22. The resiliently mounted plate 19 extends above a portion of the body of each of the carriers and has a pair of aligning sleeves 20 positioned therein to receive a pair of guide rods 9 mounted on the press 10. Each carrier is further provided with a slot 23 that extends from the forward end to approximately the middle of the carrier and is slightly offset from the longitudinal axis thereof. This slot 23 formed in the body of each of the carriers 17 and 18 is cooperable with a single pin 24 mounted on the work-feed table 11 and insures that the advancement of the carriers 17 and 18 will be positively precluded when the workpiece is positioned in proper alignment with the staking elements 8 of the press 10.

A plurality of notches or arcuate recesses generally designated by the numeral 26 are provided in the table 11 at three locations in patterns dictated by the offset mounting of the wheels 22 on the carriers 17 and 18. More specifically, the notches 26A are provided in the table in a pattern complementing the wheels 22A on the carrier 17. FIG. 4 illustrates that the forward wheels 22A are offset from the rearward wheels thereby allowing unrestricted passage of the carrier to a work station by eliminating the possibility of the forward wheels becoming lodged in the arcuate shaped recesses provided for the other wheels. Similarly, the notches 26B are provided in the table so as to complement the wheels 22B when the carrier 18 has been advanced to a point where the workpiece is positioned in proper alignment with the staking elements 8 of the press 10. These patterns are located at load positions 27 and 28 as well as at a work or fabricating station 29.

When the wheels 22 are seated within notches 26 at load positions 27 and 28, a pair of actuating rods 31 and 30 of switches 33 and 34 are engaged by the carriers 17 and 18, respectively. With the wheels of the carriers 17 and 18 seated within the notches at the load positions 27 and 28 so that the actuating rods 31 and 30 are engaged by the carrier bodies, a pair of indicating lamps 35 and 36 will be precluded from illumination. However, when an operator at either load position grasps a handle 25 and initiates the advance of a carrier toward the work station 29, the normally engaged switch-actuating rod will be released and the indicating lamp at the opposite station will become illuminated to apprise the other operator that a work-feeding process has begun.

When an operator has advanced a carrier to a point where the pin 24 engages the body of the carrier, the wheels 22 will be properly aligned with and become seated within the notches 26 at the work station 29. The seating of the wheels 22 within the notches 26 will result in the body of the carrier engaging a switch-actuating rod 37 thereby rendering a switch 38 effective. At the same time, the trailing extremity of the carrier will actuate either a switch 39 or a switch 40 and condition either counter 41 or 42 for operation. Upon actuation of the switch 38, electrical means are rendered effective to initiate a cycle of operation of the staking press 10. When the staking operation has been completed and the counter at the station has been advanced one unit, the operator will grasp the handle 25 and move the carrier along the guideway from the work station 29 and return it to the load position from which it came. The actuating rod of the switch at the load position will again be engaged thereby rendering the indicating lamp at the opposite load position ineffective.

*Mode of operation*

Figure 7:
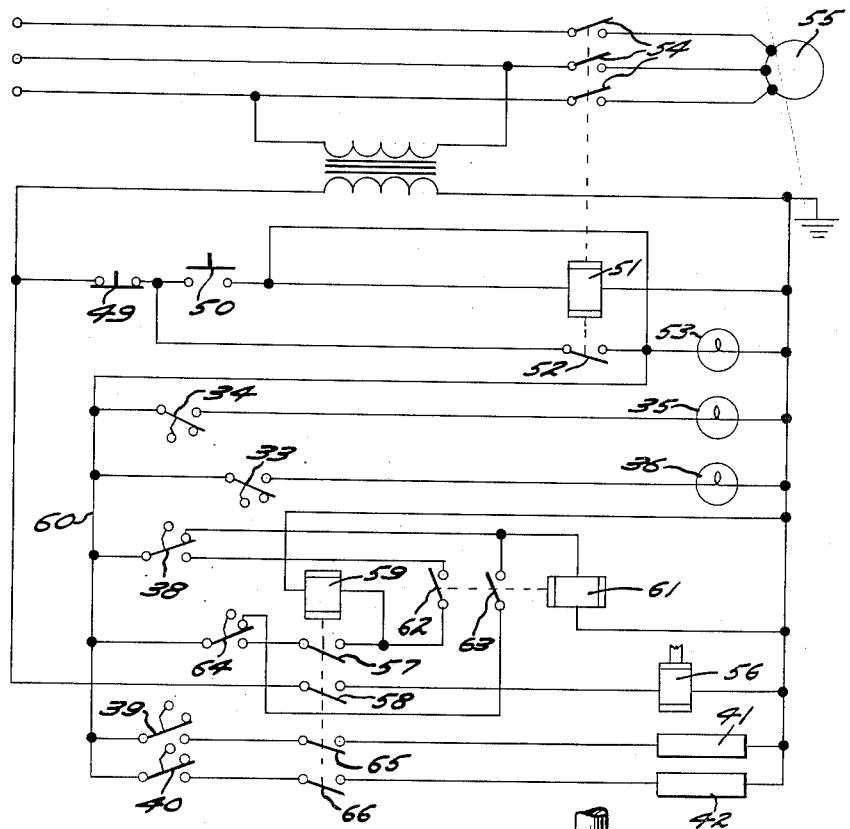
FIG. 7 is a schematic view of the control circuit for the device shown in the other figures.
Figure 6:
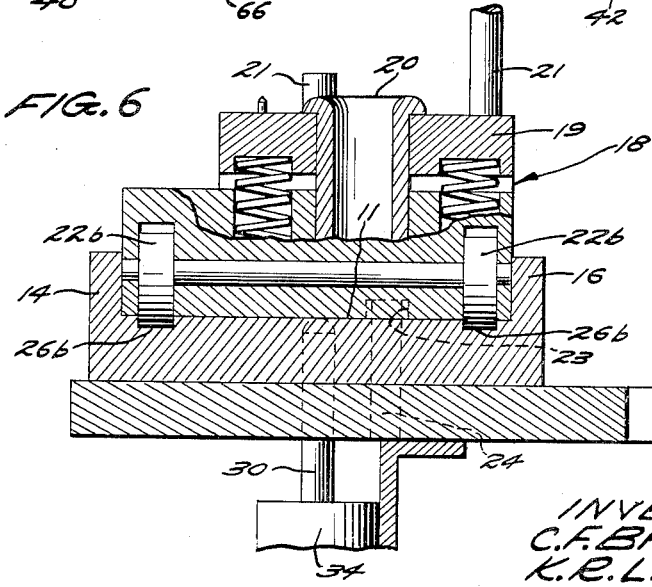
FIG. 6 is an enlarged fragmentary sectional view taken along the line 7—7 of FIG. 2.

The overall operation of the device may best be appreciated by reference to FIG. 7. The press 10 is conditioned for operation by the closure of a starting switch 50 and the subsequent energization and locking up of relay 51. The energization of relay 51 draws up contacts 52 thereby illuminating a running light 53 and providing a locking circuit which will be maintained until a stop button 49 has been depressed. Contacts 54 are also drawn up by relay 51 to condition the press motor for operation upon subsequent energization of a solenoid 56. Solenoid 56 becomes energized subsequent to the closure of contacts 57 and 58 due to the energization of a relay 59 upon movement of a carrier 17 or 18 into proper alignment beneath the staking press.

With the start switch closed, a cycle of operation is initiated when an operator at the work position 27 advances the carrier 17 toward the work station 29. The advancement of the carrier 17 from the load position results in the actuation or closure of switch 33 thereby completing a path for current to the lamp 36 which becomes illuminated to apprise the other operator that a carrier is being advanced to the work station. When the carrier 17 has been properly positioned within the work station as determined by the pin 24 and the seating of the wheels 22A within the notches 26A in the table, the switches 38 and 39 are closed.

Prior to the positioning of the carrier 17 within the work station 29, the unactuated switch 38 provides a direct path for current from a conductor 60 through a relay 61 to ground. As a result, the relay 61 is normally in an energized condition and contacts 62 and 63 are normally closed. The closure of contacts 63 provides a locking circuit for the relay 61 that may be traced from the conductor 60, through a switch 64, contacts 63 and the relay 61 to ground. The switch 64 is mounted on the press and is so positioned as to be actuated upon downward movement of the press during the staking operation and returned to an initial position when the press returns and the staking operation has been completed. The contacts 62, upon closure of the switch 38 due to the seating of a carrier within the work positions 29, provide a path for energizing current to the relay 59 thereby drawing up contacts 57 and 58. The closure of the contacts 58 results in the energization of the solenoid 56 thereby initiating a cycle of operation of the staking press. Similarly, the contacts 65 and 66 are drawn up by the energization of the relay 59; however, only the counter 41 will be advanced one unit since the switch 40 will not be closed by the advancement of the carrier 17 to the work station. As the staking press descends, the switch 64 is closed resulting in the deenergization of the relay 61 and the opening of contacts 62 and 63. This feature of the invention insures that the staking press will not operate again until the carrier 17 has been removed from the work station and either the carrier 18 or the carrier 17 has been positioned therein. The removal of the carrier 17 from the work station upon completion of the staking operation permits the switch 38 to return to a former position and condition the press for a subsequent cycle of operation by again providing a path for energizing current to the relay 61.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. In an apparatus for transferring articles to a fabricating machine, a guideway extending to and beneath the fabricating machine, said guideway having a plurality of recesses formed therein beneath the fabricating machine, an article carrier movable along said guideway and into said recesses, and means actuated by the movement of said carrier into said recesses for initiating operation of said fabricating machine.

2. In an apparatus for transferring articles, a guideway having two different patterns of notches formed therein, a pair of carriers positioned within the guideway, one of said carriers having a set of wheels mounted thereon in a pattern corresponding to one of said patterns of notches, and the other of said carriers having a set of wheels mounted thereon in a pattern corresponding to the other of said patterns of notches.

3. In a work-feed apparatus, a first work-loading station, a second work-loading station, a work-feed table extending from said first station to said second station, means movably mounted on said table for advancing work from said stations, said table having notched areas for positively seating said movably mounted means at said stations, indicating means located at each of said stations, and switch means actuated by the advancement of said movably mounted means out of seated engagement with said notched areas for rendering said indicating means effective.

4. In an apparatus for transferring articles to a fabricating station, a guideway, and a plurality of carriers positioned within said guideway, said carriers each having two pairs of wheels mounted thereon, one of said pairs of wheels being offset from the other of said pairs of wheels in distinct patterns on each of said carriers, said guideway having a plurality of arcuate recesses formed in a plurality of distinct patterns each of which complements only one of said patterns of wheels on one carrier to insure unrestricted passage of said carriers to said fabricating station.

5. In an apparatus for feeding work from a pair of oppositely disposed work-loading positions to a work station, a work-feed table extending laterally from said work station to each of said work-loading positions, workpiece advancing means mounted for movement along said table, means provided by said table for positively positioning said advancing means at said work-loading positions and said work station, indicating means at each of said oppositely disposed work-loading positions, and switch means at each of said work-loading stations actuated by movement of said advancing means out of the recessed positive positioning means for controlling the operation of said indicating means.

6. In an apparatus for feeding work from a pair of oppositely disposed work-loading positions to a work station, a work-feed table extending laterally from said work station to each of said work-loading positions, workpiece advancing means mounted for movement along said table, means provided by said table for positively positioning said advancing means at said work-loading positions and said work station, counter means associated with each of said oppositely disposed work-loading positions, and switch means at said work station actuated by movement of said advancement means into said recessed positive positioning means for controlllng the operation of said counter means.

7. An apparatus for feeding work from a load position to a work-fabricating station which comprises a work-feed table that extends from said load position to said work-fabricating station, a workpiece carrier having wheels mounted thereon for movement along said table, a plurality of notches formed in said table at said work station so as to complement and receive the wheels of said carrier, and means mounted on said table and cooperable with said carrier for positively seating said carrier at said work station by precluding the advancement thereof when said wheels are received in said notches.

8. An apparatus for feeding work to a single manufacturing station from oppositely disposed work-loading positions which comprises a work-feed table extending laterally from said manufacturing station to each of said loading positions, a pair of workpiece carriers having wheels mounted thereon for movement along said table, a plurality of notches provided by said table at each of said loading positions for seating said workpiece carrier wheels therein, indicating means at each of said oppositely disposed work-loading positions, and switch means responsive to the advancement of a carrier from a seated position within said notches at one of said work-loading stations for rendering said oppositely disposed indicating means effective.

9. In an apparatus for feeding workpieces to a fabricating machine, a guideway extending past said fabricating machine, said guideway having two distinct patterns of recesses formed therein, both of said patterns being in alignment with said fabricating machine, a pair of workpiece carriers positioned within said guideway, a first set of wheels mounted on a first of said carriers, said first set of wheels being mounted in a pattern corresponding to a first of said patterns of recesses, a second set of wheels being mounted on a second of said carriers, said second set of wheels being mounted in a pattern corresponding to a second of said patterns of recesses, and means actuated by the movement of either carrier to position the wheels thereon in one of said patterns of recesses for operating said fabricating machine.

10. In an apparatus for feeding workpieces to a fabricating machine, a guideway extending past said fabricating machine, said guideway having two distinct patterns of recesses formed therein, both of said patterns being in alignment with said fabricating machine, a pair of workpiece carriers positioned within said guideway, a first set of wheels mounted on a first of said carriers, said first set of wheels being mounted in a pattern corresponding to a first of said patterns of recesses, a second set of wheels mounted on a second of said carriers, said second set of wheels being mounted in a pattern corresponding to a second of said patterns of recesses, a first counter, a second counter, a first switch means actuated by the seating of said first set of wheels within a first of said patterns of recesses for rendering said first counter effective, a second switch means actuated by the seating of said second set of wheels within a second of said patterns of recesses for rendering said second counter effective, and means actuated by the movement of either carrier to position the wheels thereon in one of said patterns of recesses for operating said fabricating machine.

11. An apparatus for feeding work to a single manufacturing device from a first and a second work-loading position which comprises a work-feed table extending from said manufacturing device to each of said work-loading positions, a pair of workpiece carriers having wheels mounted thereon for movement along said table, certain of the wheels on each carrier being mounted in offset relationship with respect to the remaining wheels, said table having a plurality of notches formed therein at said load positions and in alignment with said manufacturing device in patterns complementing the wheels on said carriers, a first indicating means located at said first work-loading position, a first switch means located at said second work-loading position and actuated by movement of said carriers out of said notches at one of said work loading positions for controlling the operation of said first indicating means, a second indicating means located at said second work-loading position, a second switch means located at said first work-loading position and actuated by movement of another of said carriers out of said notches at the other of said loading positions for controlling the operation of said second indicating means, means mounted on said table and cooperable with a carrier advanced from one of said work-loading positions for precluding movement of said carrier beyond said manufacturing device and for positively seating the carrier in said notches, a third switch means actuated by one of said carriers being seated within said notches for initiating a cycle of operation of said device, and means responsive to the initiation of operation of said manufacturing device for precluding a recycling of said device.

12. In an apparatus for feeding articles from a pair of oppositely disposed article loading stations to a work station, a guideway extending from said article loading stations to said work station, said guideway having a plurality of recesses formed therein at said work station, a pair of article carriers movable along said guideway and into said recesses, a first counter positioned at one of said pair of article loading stations, a second counter positioned at the other of said pair of article loading stations, means located at the work station actuated by movement of either of said carriers into said recesses for conditioning both of said counters for operation, first means located at the work station actuated by movement of one of said pair of article carriers into said recesses for energizing said first counter, and second means located at the work station independently from said first means actuated by movement of the other of said pair of article carriers into said recesses for energizing said second counter.

13. In an apparatus for advancing workpieces to a fabricating machine, a guideway having a plurality of recesses formed therein in alignment with the fabricating machine, an article carrier movable on said guideway having wheels mounted thereon for movement into said recesses, switch means for controlling operation of said fabricating machine, and a rod slidably mounted in said guideway and engaged by the bottom surface of the carrier when the wheels of said carrier are in said recesses for actuating said switch means.

References Cited in the file of this patent

UNITED STATES PATENTS

| | | | |
|---|---|---|---|
| 876,553 | Huttson | Jan. 14, | 1908 |
| 2,317,440 | Cannon | Apr. 27, | 1943 |
| 2,564,782 | Franz | Aug. 21, | 1951 |